United States Patent
Hipshier

(10) Patent No.: US 9,481,323 B2
(45) Date of Patent: Nov. 1, 2016

(54) FLEXIBLE INTERIOR TRIM COMPONENT HAVING A SMOOTH SURFACE

(76) Inventor: Jason M. Hipshier, Hudsonville, MI (US)

( * ) Notice: Subject to any disclaimer, the term of this patent is extended or adjusted under 35 U.S.C. 154(b) by 1359 days.

(21) Appl. No.: 12/630,067

(22) Filed: Dec. 3, 2009

(65) Prior Publication Data

US 2010/0133866 A1 Jun. 3, 2010

Related U.S. Application Data

(60) Provisional application No. 61/119,563, filed on Dec. 3, 2008.

(51) Int. Cl.
*B60R 13/02* (2006.01)
*B29C 45/16* (2006.01)
*B29L 31/30* (2006.01)

(52) U.S. Cl.
CPC ....... *B60R 13/0262* (2013.01); *B29C 45/1676* (2013.01); *B29L 2031/3005* (2013.01)

(58) Field of Classification Search
CPC ........... B60R 13/0262; B29C 45/1676; B29L 2031/3005
USPC ....... 296/24.34, 37.1, 37.8, 37.12; 220/345.1
See application file for complete search history.

(56) References Cited

U.S. PATENT DOCUMENTS

| | | | |
|---|---|---|---|
| 2,064,470 A | 12/1936 | Heckman | |
| 2,573,962 A | 11/1951 | Fox et al. | |
| 3,717,247 A | 2/1973 | Moore | |
| 3,870,391 A | 3/1975 | Nims | |
| 4,157,845 A | 6/1979 | Queveau | |
| 4,854,632 A * | 8/1989 | Kreuze et al. | 296/37.12 |
| 4,923,244 A | 5/1990 | Clenet | |
| 4,934,750 A | 6/1990 | Eichler et al. | |
| 5,169,699 A | 12/1992 | Prince | |
| 5,752,740 A | 5/1998 | Volkmann et al. | |
| 6,217,112 B1 | 4/2001 | Linsenmeier et al. | |
| 6,231,940 B1 | 5/2001 | Aichner et al. | |
| 6,398,890 B1 | 6/2002 | Spoerle | |
| 6,499,785 B2 * | 12/2002 | Eguchi | 296/37.8 |
| 6,558,497 B2 | 5/2003 | Franco et al. | |
| 6,672,554 B2 * | 1/2004 | Fukuo | 248/311.2 |
| 6,699,349 B1 | 3/2004 | Sporle et al. | |
| 6,845,032 B2 | 1/2005 | Toyoda et al. | |
| 6,883,852 B2 * | 4/2005 | Laskey | 296/37.8 |
| 6,953,612 B2 | 10/2005 | Spoerle | |
| 7,087,842 B2 | 8/2006 | Belli et al. | |
| 7,287,795 B1 * | 10/2007 | Thomas | 296/24.34 |
| 7,341,297 B2 * | 3/2008 | Nakamura et al. | 296/24.34 |
| 7,343,956 B2 | 3/2008 | Schleef et al. | |
| 7,475,954 B1 * | 1/2009 | Latunski | 312/297 |
| 7,581,773 B2 * | 9/2009 | Strasser et al. | 296/1.09 |

(Continued)

FOREIGN PATENT DOCUMENTS

DE 3807880 9/1989
DE 4010241 4/1991

(Continued)

*Primary Examiner* — Gregory Blankenship

(57) ABSTRACT

An interior trim component is provided that includes multiple substantially parallel ribs each configured to engage a track to facilitate movement of the interior trim component along the track. The interior trim component also includes a substrate having a first surface and a second surface. The first surface is coupled to the ribs, and the second surface is opposite the first surface and is substantially smooth.

14 Claims, 5 Drawing Sheets

(56) References Cited

U.S. PATENT DOCUMENTS

| | | | |
|---|---|---|---|
| 7,588,280 B2* | 9/2009 | Dobos et al. | 296/37.12 |
| 7,591,499 B2 | 9/2009 | Jonischkeit | |
| 7,597,130 B2 | 10/2009 | Ichimaru et al. | |
| 7,721,926 B2* | 5/2010 | Thomas | 224/554 |
| 7,735,538 B2* | 6/2010 | Ogawa | 160/230 |
| 7,794,000 B2* | 9/2010 | Ichimaru | 296/24.34 |
| 8,007,020 B2* | 8/2011 | Hipshier et al. | 296/37.8 |
| 8,033,588 B2* | 10/2011 | Luginbill et al. | 296/24.34 |
| 2001/0021438 A1 | 9/2001 | Landvik | |
| 2002/0005424 A1 | 1/2002 | Lange et al. | |
| 2002/0030375 A1* | 3/2002 | Eguchi | 296/37.8 |
| 2003/0052128 A1* | 3/2003 | Cheever et al. | 220/259.1 |
| 2003/0052129 A1 | 3/2003 | Fukuo | |
| 2004/0003890 A1 | 1/2004 | Bauer et al. | |
| 2004/0029030 A1 | 2/2004 | Murray | |
| 2004/0065456 A1 | 4/2004 | Belli et al. | |
| 2004/0118851 A1* | 6/2004 | Shinomiya | 220/345.1 |
| 2004/0130174 A1* | 7/2004 | Laskey | 296/37.1 |
| 2005/0098257 A1 | 5/2005 | Bauer et al. | |
| 2005/0189776 A1* | 9/2005 | Sturt | 296/24.34 |
| 2005/0194825 A1 | 9/2005 | Kurz et al. | |
| 2005/0252317 A1 | 11/2005 | Ueki | |
| 2005/0276874 A1 | 12/2005 | Menaldo et al. | |
| 2006/0066118 A1 | 3/2006 | Radu et al. | |
| 2006/0186696 A1* | 8/2006 | Dobos et al. | 296/152 |
| 2007/0102463 A1* | 5/2007 | Thomas | 224/275 |
| 2007/0125500 A1 | 6/2007 | Gosling et al. | |
| 2007/0246963 A1* | 10/2007 | Thomas | 296/37.8 |
| 2008/0084083 A1 | 4/2008 | Boddie et al. | |
| 2008/0129071 A1* | 6/2008 | Hipshier et al. | 296/37.8 |
| 2009/0072568 A1* | 3/2009 | Luginbill et al. | 296/37.8 |
| 2010/0045060 A1* | 2/2010 | Hipshier | 296/24.34 |
| 2010/0052352 A1* | 3/2010 | Hipshier et al. | 296/37.8 |
| 2010/0066115 A1* | 3/2010 | Hipshier et al. | 296/37.8 |
| 2012/0074726 A1* | 3/2012 | Takai et al. | 296/24.34 |

FOREIGN PATENT DOCUMENTS

| | | |
|---|---|---|
| DE | 4220670 | 1/1994 |
| DE | 9403833 | 5/1994 |
| DE | 4309620 | 9/1994 |
| DE | 19524177 | 8/1996 |
| DE | 19646809 | 5/1998 |
| DE | 19654246 | 6/1998 |
| DE | 19822425 | 2/2000 |
| DE | 19909642 | 4/2000 |
| DE | 19923512 | 12/2000 |
| DE | 10023778 | 11/2001 |
| DE | 202004006649 | 9/2004 |
| DE | 102005006119 | 8/2006 |
| DE | 102008018557 | 10/2009 |
| DE | 102009057783 | 6/2011 |
| EP | 1600330 | 11/2005 |
| EP | 1690740 | 8/2006 |
| GB | 599652 | 3/1948 |
| WO | 2008064210 | 5/2008 |
| WO | 2011069682 | 6/2011 |
| WO | 2011143467 | 11/2011 |
| WO | 2012094340 | 7/2012 |

* cited by examiner

FLEXIBLE INTERIOR TRIM COMPONENT HAVING A SMOOTH SURFACE

CROSS REFERENCE TO RELATED APPLICATION

This application claims priority from and the benefit of U.S. Provisional Application Ser. No. 61/119,563, entitled "FLEXIBLE COMPONENT WITH A SMOOTH SURFACE", filed Dec. 3, 2008, which is hereby incorporated by reference in its entirety.

BACKGROUND

The invention relates generally to a flexible interior trim component for a vehicle, having a smooth surface.

Vehicle storage compartments may be positioned throughout an interior of a vehicle to store cargo and other small items. For example, an overhead console may include a storage compartment suitable for storing sunglasses, driving glasses, or other items. Other storage compartments may be located within a center console, an armrest, seats, door panels, or other areas of the vehicle interior. Certain storage compartments include a door configured to secure the contents of the compartment and/or hide the contents from view.

While a variety of door configurations may be employed, tambour doors are generally well-suited for storage compartments having curved openings. Typical tambour doors include a series of interlocked parallel ribs or segments that may rotate with respect to one another. In this manner, the tambour door may flex in a direction perpendicular to the orientation of the parallel segments. Such a configuration may enable the tambour door to match the contours of the curved storage compartment opening, thereby facilitating movement of the tambour door with respect to the storage compartment opening. To facilitate tambour door segment rotation, a recess may be positioned adjacent to each segment. Unfortunately, the recesses may collect dirt and/or other contaminants, thereby degrading the appearance of the door. In addition, as the tambour door flexes, adjacent segments may rotate toward one another, thereby reducing the width of the intervening recesses. The decreasing width of these recesses may establish undesirable pinch points between adjacent segments.

BRIEF DESCRIPTION OF THE INVENTION

The present invention relates to an interior trim component including multiple substantially parallel ribs each configured to engage a track to facilitate movement of the interior trim component along the track. The interior trim component also includes a substrate having a first surface and a second surface. The first surface is coupled to the ribs, and the second surface is opposite the first surface and is substantially smooth.

The present invention also relates to an interior trim component including multiple substantially parallel ribs. The interior trim component also includes a substrate coupled to the substantially parallel ribs such that the interior trim component is capable of bending in a direction substantially perpendicular to an orientation of the substantially parallel ribs. A surface of the substrate nonadjacent to the substantially parallel ribs is substantially smooth.

The present invention further relates to a method of manufacturing an interior trim component. The method includes injecting a first resin into a mold having multiple substantially parallel grooves to form a corresponding set of substantially parallel ribs. The method also includes injecting a second resin into a cavity positioned adjacent to the substantially parallel grooves such that the second resin forms a substrate bonded to the substantially parallel ribs. A surface of the cavity opposite from the substantially parallel grooves is substantially smooth to form a substantially smooth surface of the substrate.

DRAWINGS

DETAILED DESCRIPTION

Figure 1:
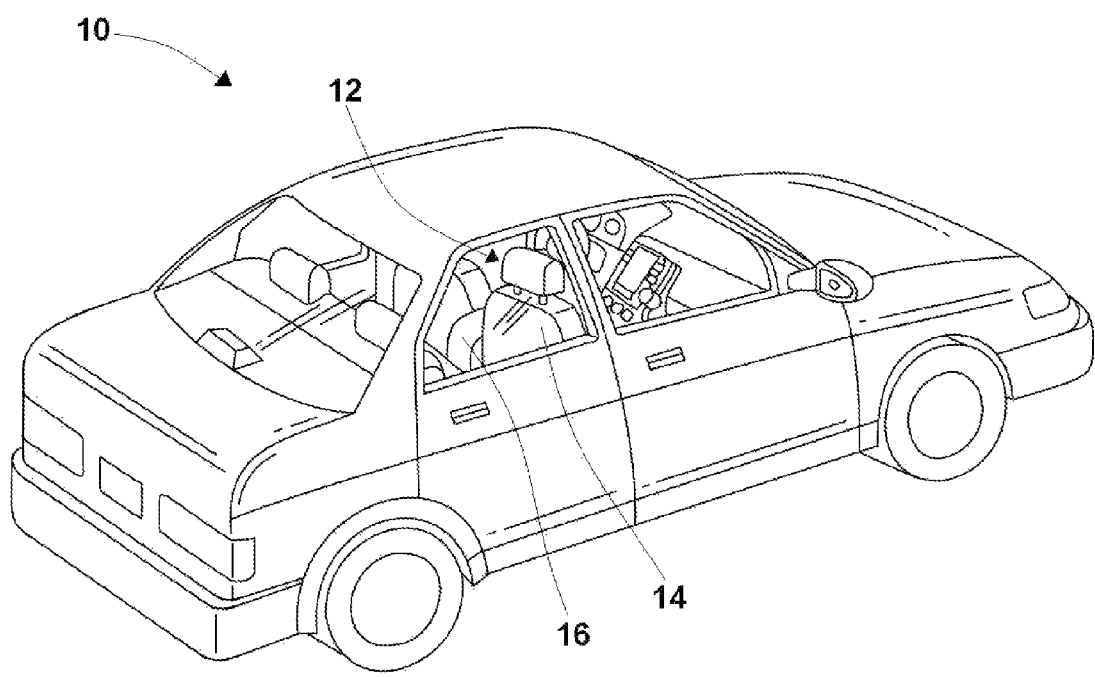
FIG. 1 is a perspective view of an exemplary vehicle that may include one or more storage compartments each having a flexible door with a substantially smooth show surface.

FIG. 1 is a perspective view of an exemplary vehicle 10, including an interior 12 having seats 14 and a center console 16. As discussed in detail below, the center console 16 and/or other areas within the interior 12 may include a flexible interior trim component having a smooth surface, such as a flexible door enclosing a storage compartment. For example, certain storage compartments may employ a flexible tambour door having multiple substantially parallel ribs. These ribs may be configured to engage a track, thereby facilitating movement of the tambour door along an opening of the storage compartment. The tambour door may also include a substrate having an interior surface facing an interior of the storage compartment, and an exterior show surface facing the interior 12 of the vehicle 10. The interior surface may be coupled to the substantially parallel ribs such that the tambour door may flex in a direction perpendicular to the orientation of the substantially parallel ribs. Such a configuration may enable the tambour door to match the contours of a curved storage compartment opening, thereby facilitating movement of the tambour door with respect to the storage compartment opening. As discussed in detail below, the exterior show surface of the tambour door may be substantially smooth, thereby providing a clean appearance within the vehicle interior 12.

As will be appreciated, typical tambour doors include a series of interlocked or otherwise joined parallel ribs or segments that may rotate with respect to one another. To facilitate tambour door segment rotation, a recess may be positioned adjacent to each segment. These recesses may collect dirt and/or other contaminants, thereby degrading the appearance of the door. In addition, as the tambour door flexes, adjacent segments may rotate toward one another, thereby reducing the width of the intervening recesses. The decreasing width of the recesses may establish undesirable pinch points between adjacent segments. By providing a substantially smooth show surface, the present embodiments may eliminate these recesses. As a result, any dirt or other contaminants which collect on the surface of the tambour door may be easily removed. In addition, the possibility of pinching between segments may be substantially reduced or eliminated. Furthermore, the substantially smooth surface may enable a vehicle occupant to utilize the tambour door as a writing surface and/or provide a suitable surface for applying a decoration.

Figure 2:
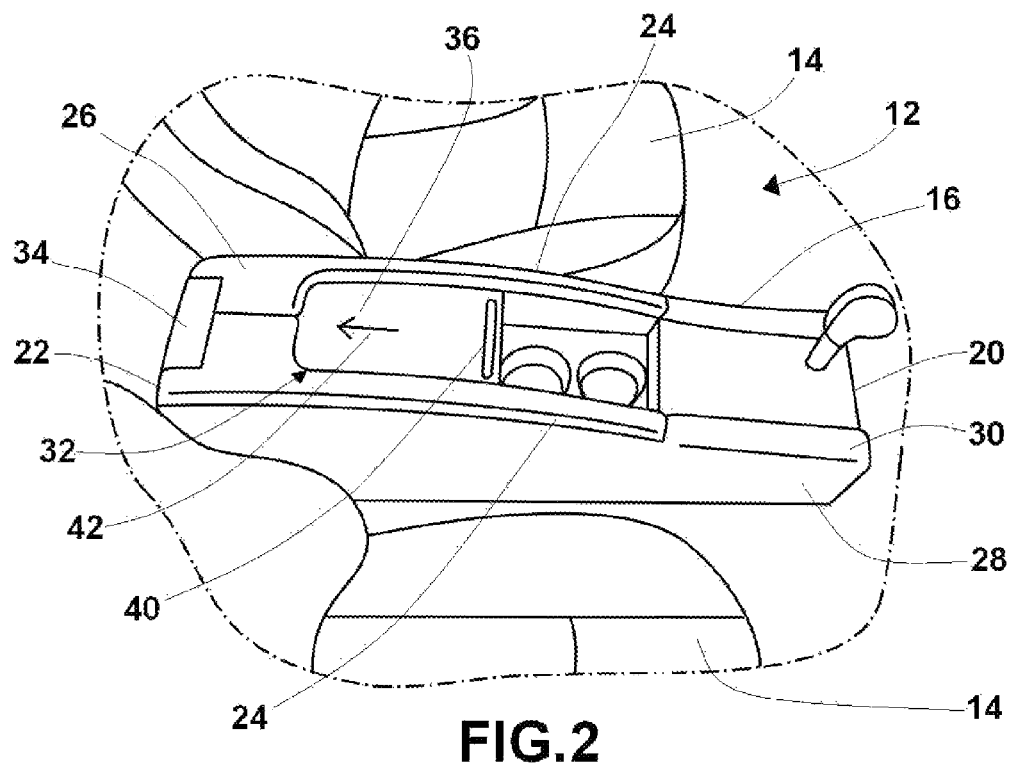
FIG. 2 is a perspective view of an exemplary center console that may be located within an interior of the vehicle of FIG. 1.

FIG. 2 is a perspective view of an exemplary center console 16 that may be located within an interior of the vehicle of FIG. 1. As discussed in detail below, the center console 16 may include a storage compartment enclosed by a flexible tambour door having a substantially smooth show surface. As illustrated, the console 16 is coupled to a floor of the vehicle interior 12 between a driver seat 14 and a passenger seat 14. In the present configuration, the console 16 is configured to provide a storage area and an armrest for an occupant of one or both seats 14. The console 16 is generally prismatic, having a front wall 20, a rear wall 22, two opposed and generally symmetrical side walls 24 and a top surface 26.

The console 16 also includes two side panels 28 which form the main body of the console 16. In the present configuration, each side panel 28 provides one of the side walls 24 of the console 16 and portions of the rear wall 22, the front wall 20 and the top surface 26. As illustrated, the side walls 24 include a compound-curved upper contour having both convex and concave portions, thereby transitioning between the raised rear wall 22 and the lower front wall 20. The top edges 30 of the side panels 28 form the curved top surface 26. The top surface 26 includes an opening 32 that enables an occupant to access an interior of the console 16. In certain configurations, the console 16 includes a rear panel 34 forming a portion of the rear wall 22 and/or the top surface 26.

In the present configuration, the console 16 includes a door 36 configured to transition between an open position and the illustrated closed position. The door 36 includes a handle 40 that may enable an occupant to slide the door 36 between the two positions. As discussed in detail below, sliding the door 36 toward the open position in the direction 42 will expose an interior of a storage compartment located within the console 16. In certain configurations, the door 36 is a tambour door having a series of substantially parallel ribs coupled to a substrate. The ribs are configured to engage a track within the side walls 24, while the substrate enables the door 36 to flex and accommodate the contours of the opening 32. As illustrated, an exterior show surface of the door 36 is substantially smooth, thereby eliminating the recesses of typical tambour door configurations. Because the show surface of the door 36 is substantially smooth, dirt and/or other contaminants may be removed more easily than configurations employing recesses. Furthermore, the possibility of pinching between segments may be substantially reduced or eliminated.

While the present tambour door is described with reference to the center console 16, it should be appreciated that alternative embodiments may employ similar tambour doors positioned throughout the interior 12 of the vehicle 10. For example, a storage compartment located within an overhead console, door panel, instrument panel, or other region of the interior 12 may include a flexible door having a substantially smooth show surface. Furthermore, other flexible interior trim components, in addition to the doors described above, may include similar parallel ribs and a substrate having a smooth show surface. As discussed in detail below, providing such a smooth show surface may enable a vehicle occupant to utilize the interior trim component as a writing surface and/or facilitate application of a decoration to the show surface.

Figure 3:
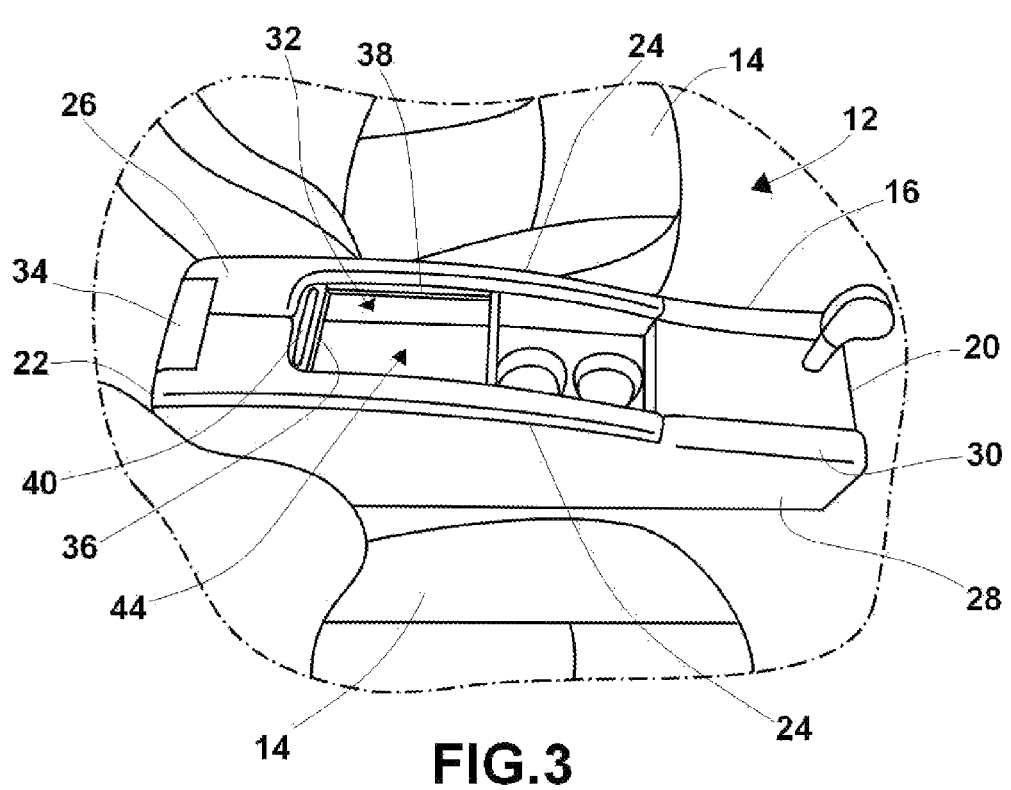
FIG. 3 is a perspective view of the center console of FIG. 2 with a flexible door in an open position.

FIG. 3 is a perspective view of the center console 16 of FIG. 2 with the flexible door 36 in an open position. As illustrated, the side walls 24 include rails or tracks 38 configured to facilitate movement of the door 36 in the direction 42. In certain configurations, the tracks 38 include a C-shaped cross section, and may be coupled to the side panels 28 or integrally formed within the side panels 28. As discussed in detail below, the substantially parallel ribs of the tambour door 36 include protrusions which engage the tracks 38 and support the door 36, while the attached substrate enables the door 36 to flex, thereby accommodating the contours of the opening 32. As illustrated, transitioning the door 36 to the open position exposes an interior 44 of the storage compartment within the center console 16.

As will be appreciated, a vehicle occupant may close the door 36 by grasping the handle 40 and moving the door 36 toward the front wall 20 of the center console 16. Because the surface of the door 36 facing the interior 12 of the vehicle 10 is substantially smooth, the possibility of being pinched by segments of the door 36 may be substantially reduced or eliminated. Once in the closed position, the smooth show surface of the door 36 may provide a suitable surface for writing and/or storage of small items. In addition, the show surface may be suitable for apply a decoration to the door 36 to enhance the appearance of the vehicle interior 12.

Figure 4:
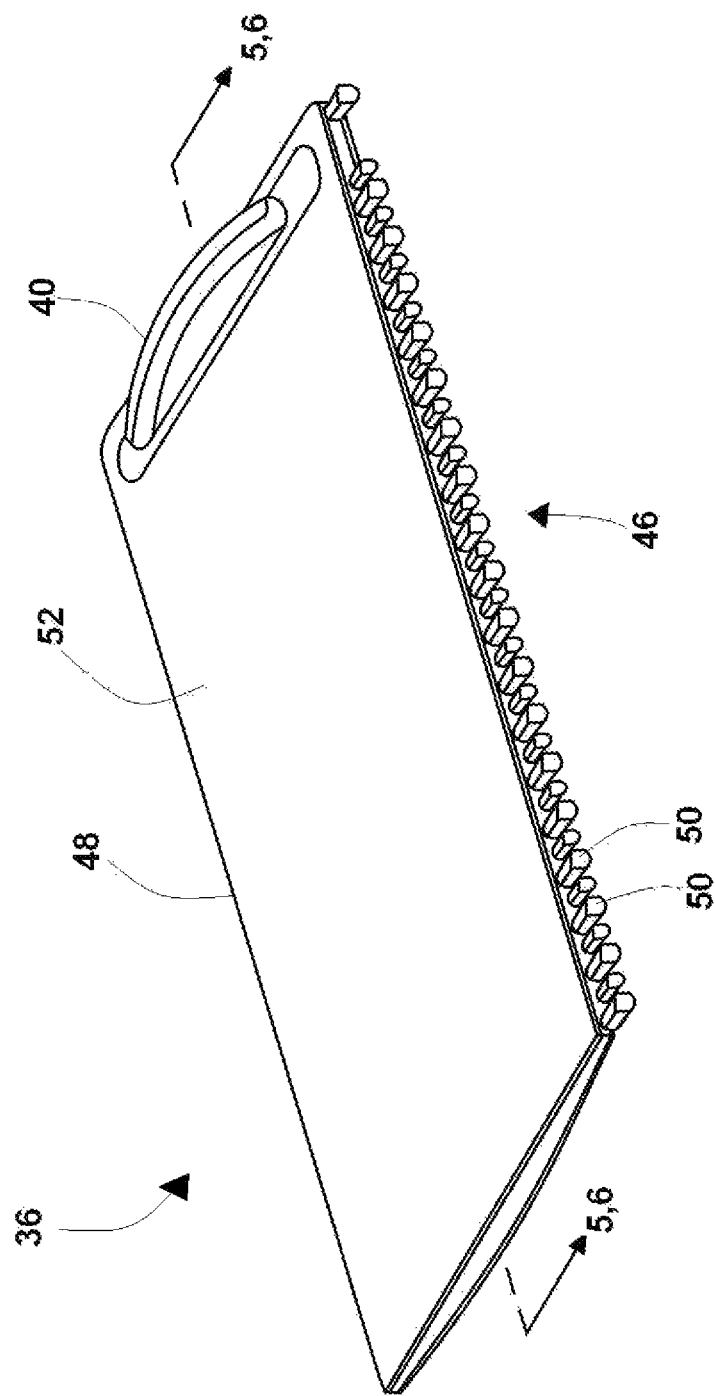
FIG. 4 is a perspective view of an exemplary flexible door with a substantially smooth show surface that may be employed within the center console of FIG. 2.

FIG. 4 is a perspective view of an exemplary flexible door with a substantially smooth show surface that may be employed within the center console of FIG. 2. As illustrated, the flexible door 36 includes multiple substantially parallel ribs 46 coupled to a substrate 48. The ribs 46 are configured to engage the tracks 38 of the console 16 to support the door 36 and to facilitate movement of the door 36 across the opening 32. Specifically, the ribs 46 include protrusions 50 configured to interlock with a corresponding recess within each track 38. As discussed in detail below, the ribs 46 are coupled to a surface of the substrate 48 facing the interior 44 of the console 16, thereby forming a unitary structure. In this configuration, the door 36 may flex in a direction perpendicular to the orientation of the substantially parallel ribs 46, thereby enabling the tambour door to match the contours of a curved storage compartment opening. Furthermore, the substrate 48 includes a show surface 52 that provides a smooth, consistent appearance on the outer surface of the flexible door 36.

As previously discussed, the flexible door 36 includes a handle 40 configured to facilitate movement of the door 36 between the open and closed positions. As will be appreciated, alternative embodiments may employ other components (e.g., knobs, recesses, etc.) in place of the handle 40 to control movement of the door 36. As discussed in detail below, the door 36 may be formed by an injection molding process. Therefore, the ribs 46 and/or the substrate 48 may be composed of any suitable material for injection molding. For example, the ribs 46 may be composed of a thermoplastic polymer, such as polypropylene (PP), while the substrate 48 may be made from a thermoplastic elastomer (TPE). It should be appreciated that the ribs 46 and the substrate 48 may be composed of other materials suitable for injection molding in alternative embodiments. In addition, the ribs 46 and/or the substrate 48 may include a chemical blowing agent and/or any other suitable additives. Further embodiments may employ other construction methods such as directly bonding the ribs 46 to the substrate 48. In such embodiments, other materials such as plastic, metal, or wood, for example, may be utilized to form the ribs 46 and/or the substrate 48.

In contrast to tambour door configurations having segmented show surfaces, the flexible door 36 of the present embodiments does not include separate segments that rotate relative to one another. Instead, the substrate 48 is flexible, allowing the ribs 46 to move relative to one another while maintaining a unitary visual appearance of the flexible door 36. In addition, the show surface 52 of the substrate 48 is substantially smooth, thereby substantially reducing or eliminating the possibility of establishing pinch points, and forming a surface suitable for writing. Furthermore, the smooth surface may be easier to clean than door configurations having a recess between each segment.

Figure 5:
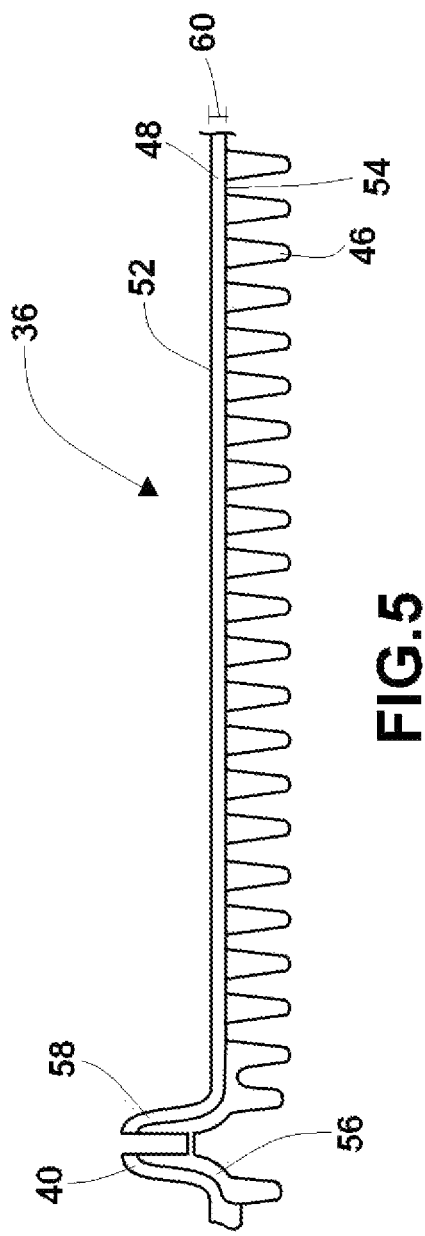
FIG. 5 is a cross-sectional view of a first embodiment of the flexible door, taken along line 5-5 of FIG. 4.

FIG. 5 is a cross-sectional view of a first embodiment of the flexible door, taken along line 5-5 of FIG. 4. As illustrated, the ribs 46 are coupled to a first surface 54 of the substrate 48 which faces the interior 44 of the console 16. As discussed in detail below, the door 36 may be formed by an injection molding process. As will be appreciated, injection molding involves injecting liquid resin into a mold to form a completed part. In embodiments in which the door 36 is formed by injection molding, the ribs 46 may be coupled to the substrate 48 by a melt bonding process. Specifically, a first resin is injected into the mold to form the ribs 46. Then, a second resin is injected to form the substrate 48. Heat from the second resin will cause the ribs 46 to partially reflow, thereby forming a rigid connection between the ribs 46 and the substrate 48 as the resins harden. As will be appreciated, alternative embodiments may employ other coupling mechanisms between the ribs 46 and the substrate 48.

Furthermore, as illustrated, the handle 40 includes a first layer 56 and a second layer 58. The first layer may be formed during the injection molding process from the same material which comprises the ribs 46. For example, the first layer 56 and the ribs 46 may be formed during injection of the first resin into the mold. Similarly, the second layer 58 and the substrate 48 may be formed from the same material during injection of the second resin into the mold. In this manner, the handle 40 is integrally coupled to the substrate 48 of the flexible door 36.

A thickness 60 of the substrate 48 may be configured to facilitate bending of the door 36 in a direction substantially perpendicular to an orientation of the substantially parallel ribs 46, while maintaining a substantially smooth show surface 52. As will be appreciated, temperature variations within the mold may cause ripples within the substrate 52 corresponding to the spacing between ribs 46. Consequently, the thickness 60 may be selected to provide sufficient material between the ribs 46 and the show surface 52 to compensate for the temperature variation induced ripples. For example, in certain embodiments, the thickness 60 may be greater than approximately 1 mm. By way of example, the thickness 60 may be approximately between 1 to 2, 1.2 to 1.8, 1.4 to 1.6, or about 1.5 mm.

In addition, the substrate 48 may be composed of a material particularly selected to provide durability, while maintaining the flexibility of the door 36. As will be appreciated, flexibility and durability of the substrate 48 may be measured by determining the hardness of the constituent material. One measure of hardness is the resistance to indentation, otherwise referred to as Durometer, denoted in the Shore A scale, for example. Within the Durometer scale, materials are generally characterized based on ranges. Hard or rigid elastomers generally include those having a Durometer greater than about 90 Shore A, soft elastomers generally include those having a Durometer of about 60 Shore A to about 90 Shore A, and super-soft elastomers generally include those having a Durometer below about 60 Shore A. In certain embodiments, the substrate 48 may be composed of a material having a Durometer of approximately between 70 to 90 Shore A. Utilizing such a material may facilitate bending of the door 36 in a direction substantially perpendicular to an orientation of the substantially parallel ribs 46, while maintaining durability and smoothness of the show surface 52.

The combination of selecting an appropriate thickness 60 to reduce temperature variation induced ripples and selecting a suitable material having a desired hardness may establish a substantially smooth show surface 52. In certain embodiments, smoothness may be defined by dimensional variations within the show surface 52 of the substrate 48. For example, dimensional variations within the show surface 52 may be between approximately 0.5 to 0.01, 0.3 to 0.03, 0.2 to 0.05, or about 0.1 mm. By further example, dimensional surface variations may be less than approximately 0.5, 0.3, 0.2, 0.1, 0.05, 0.03, or about 0.01 mm. Such a smooth surface 52 may enhance the appearance of the vehicle interior 12, provide a surface suitable for writing, and/or facilitate application of a decoration.

Figure 6:
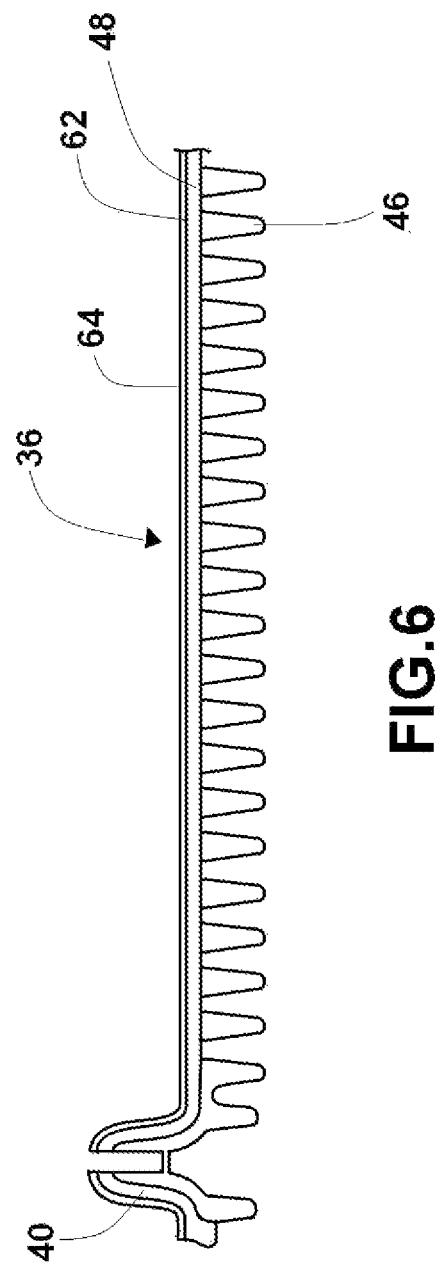
FIG. 6 is a cross-sectional view of a second embodiment of the flexible door, taken along line 6-6 of FIG. 4.

FIG. 6 is a cross-sectional view of a second embodiment of the flexible tambour door 36, taken along line 6-6 of FIG. 4. As illustrated, the flexible door 36 includes an additional coating layer 62 disposed on the exterior surface 52 of the substrate 48 to increase a smoothness of the show surface. For example, as previously discussed, if the door 36 is formed by an injection molding process, temperature variations within the mold may cause ripples to form within the substrate 48. In the embodiment described above with reference to FIG. 5, the thickness 60 of the substrate 48 is particularly selected to compensate for the ripples, and to provide a smooth show surface. However, in certain embodiments, the thickness of the substrate 48 may not be sufficient to substantially eliminate the ripples between ribs 46. Consequently, the illustrated embodiment includes the additional coating layer 62 to fill in recesses within the substrate 48, and to form a substantially smooth show surface 64.

It should be appreciate that, in various exemplary embodiments, the additional coating layer 62 may be composed of the same or similar material as the substrate 48. For example, the coating layer 62 may be formed from a TPE. In alternative embodiments, the additional coating layer 62 may be composed of any other suitable material, such as a clear coat or gel coat, for example. In certain embodiments, the door 36 may be formed by an injection molding process. As previously discussed, a first resin may be injected into a mold to form the ribs 46. Then, a second resin may be injected to form the substrate 48. In the present embodiment, after the ribs 46 and substrate 48 have been formed, a third resin may be injected over the outer surface 52 of the substrate 48 to form the coating layer 62. As will be appreciated, heat from the third resin will cause a portion of the substrate 48 to reflow, thereby bonding the substrate 48 to the coating layer 62 as the resins harden. In alternative embodiments, the coating layer 62 may be sprayed or otherwise applied to the substrate 48 to fill in the recesses and form a substantially smooth show surface 64. In certain embodiments, the substrate 48 and/or the coating layer 62 may be composed of a material having sufficient flexibility to substantially reduce or eliminate the possibility of cracking or separation of the substrate 48 from the additional coating layer 62 as the door 36 flexes during operation.

It should also be appreciated that the substantially smooth show surface 52 or 64 of the flexible door 36 may provide additional aesthetic opportunities, such as, for example, increased ability to provide decorative images (e.g., through screen printing, hydrographic printing, etc.) on the flexible door 36. In certain embodiments, the flexible door 36 may include additional layers that provide decorative designs and/or textures to the door 36. The substantially smooth layer 52 or 64 may also provide a suitable surface for writing on the center console 16, which is conveniently positioned adjacent to a driver or front passenger.

Figure 7:
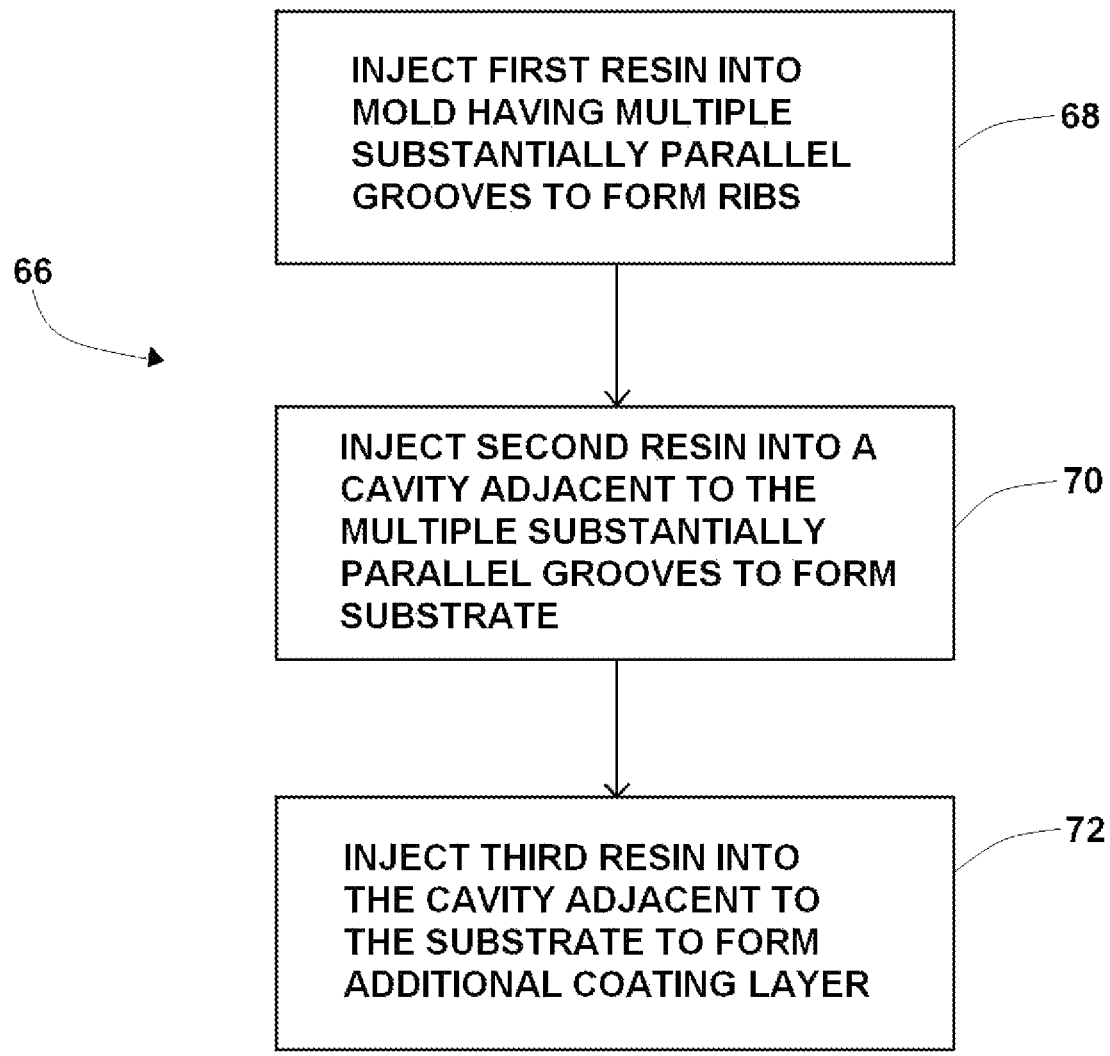
FIG. 7 is a process flow diagram of an exemplary injection molding process that may be utilized to form the flexible door.

FIG. 7 is a process flow diagram of an exemplary injection molding process 66 that may be utilized to form the flexible door 36. First, as represented by block 68, a first resin is injected into a mold having multiple substantially parallel grooves to form corresponding substantially parallel ribs 46. As previously discussed, the first resin may be a thermoplastic polymer, such as polypropylene (PP), for example. However, as will be appreciated, any suitable resin appropriate for injection molding may be utilized in alternative embodiments. The resin may be selected to form ribs 46 having sufficient bending resistance to support the door 36 during operation.

After the first resin has cured and/or hardened, a second resin is injected into a cavity positioned adjacent to the substantially parallel grooves such that the second resin forms the substrate 48, as represented by block 70. As previously discussed, heat from the second resin will cause the ribs 46 to partially reflow, thereby forming a rigid connection between the ribs 46 and the substrate 48 as the resins cure and/or harden. In certain embodiments, a surface of the cavity is substantially smooth to form the substantially smooth show surface 52 of the substrate 48. The second resin may be a TPE, or any other suitable resin appropriate for injection molding. The resin may be selected to form a durable substrate 48, while maintaining the flexibility of the door 36.

In certain embodiments, the injection molding process 66 may include the additional step of injecting a third resin within the cavity adjacent to the exterior surface 52 of the substrate 48 to form the coating layer 62, as represented by block 72. As previously discussed, the additional coating layer 62 may fill in recesses within the substrate 48, and form a substantially smooth show surface 64. It should be appreciate that, in various exemplary embodiments, the additional coating layer 62 may be composed of the same or similar material as the substrate 48. For example, the coating layer 62 may be formed from a TPE, or any other suitable material, such as a clear coat or gel coat, for example. It should also be appreciated that the flexible door 36 having a smooth show surface may be formed by other construction techniques in alternative embodiments. Furthermore, while a tambour door 36 is described above, it should be appreciated that alternative flexible interior trim components having a smooth show surface may be utilized throughout the vehicle interior 12.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or resequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An interior trim component, comprising:
   a plurality of substantially parallel ribs each configured to engage a track to facilitate movement of the interior trim component along the track; and
   a substrate having a first surface and a second surface, wherein the first surface is coupled to the plurality of ribs, the second surface is opposite the first surface, and the second surface is substantially smooth with dimensional variations of less than approximately 0.5 mm;
   wherein each rib is formed from a first material, and the substrate is formed from a second material, different than the first material.

2. The interior trim component of claim 1, wherein a thickness of the substrate is configured to facilitate bending of the interior trim component in a direction substantially perpendicular to an orientation of the plurality of substantially parallel ribs.

3. The interior trim component of claim 1, wherein a thickness of the substrate is greater than approximately 1 mm.

4. The interior trim component of claim 1, wherein the second material has a hardness of greater than approximately 70 Shore A Durometer and less than approximately 90 Shore A Durometer.

5. The interior trim component of claim 1, wherein the interior trim component is configured to substantially enclose a storage compartment.

6. The interior trim component of claim 1, comprising a handle integrally coupled to the substrate.

7. The interior trim component of claim 1, comprising a coating layer disposed on the second surface of the substrate to increase a smoothness of the second surface.

8. The interior trim component of claim 1, wherein the first material comprises a thermoplastic polymer, and the second material comprises a thermoplastic elastomer.

9. An interior trim component, comprising:
   a plurality of substantially parallel ribs; and
   a substrate coupled to the plurality of substantially parallel ribs such that the interior trim component is capable of bending in a direction substantially perpendicular to an orientation of the plurality of substantially parallel ribs, wherein a surface of the substrate nonadjacent to the plurality of substantially parallel ribs is substantially smooth with dimensional variations of less than approximately 0.5 mm;
   wherein each rib is formed from a first material, and the substrate is formed from a second material, different than the first material.

10. The interior trim component of claim 9, wherein the interior trim component forms a tambour door configured to substantially enclose a storage compartment.

11. The interior trim component of claim 9, comprising a handle integrally coupled to the substrate.

12. The interior trim component of claim 9, comprising a coating layer disposed on the substantially smooth surface of the substrate to increase a smoothness of the substantially smooth surface.

13. The interior trim component of claim 9, wherein each of the plurality of substantially parallel ribs is configured to engage a track to facilitate movement of the interior trim component along the track.

14. The interior trim component of claim 9, wherein the first material comprises a thermoplastic polymer, and the second material comprises a thermoplastic elastomer.

\* \* \* \* \*